US010692147B1

(12) United States Patent
Ruble

(10) Patent No.: US 10,692,147 B1
(45) Date of Patent: Jun. 23, 2020

(54) COLLABORATIVE TRUST PLATFORM WITH PORTABLE FILES

(71) Applicant: Tod A. Ruble, Dallas, TX (US)

(72) Inventor: Tod A. Ruble, Dallas, TX (US)

(*) Notice: Subject to any disclaimer, the term of this patent is extended or adjusted under 35 U.S.C. 154(b) by 297 days.

(21) Appl. No.: 15/891,141

(22) Filed: Feb. 7, 2018

Related U.S. Application Data

(60) Provisional application No. 62/462,636, filed on Feb. 23, 2017.

(51) Int. Cl.
*G06Q 40/06* (2012.01)
*G06Q 40/02* (2012.01)

(52) U.S. Cl.
CPC .......... *G06Q 40/06* (2013.01); *G06Q 40/025* (2013.01)

(58) Field of Classification Search
CPC ...................................... G06Q 40/06
See application file for complete search history.

(56) References Cited

U.S. PATENT DOCUMENTS

| 5,933,815 | A | 8/1999 | Golden | |
|---|---|---|---|---|
| 6,041,313 | A * | 3/2000 | Gilbert | G06Q 40/02 705/36 R |
| 7,222,093 | B2 * | 5/2007 | Block | G06Q 20/10 705/35 |
| 7,376,608 | B1 | 5/2008 | Dellinger et al. | |
| 7,454,376 | B1 * | 11/2008 | Argenbright | G06Q 40/00 705/35 |
| 7,853,509 | B2 | 12/2010 | Mercier et al. | |
| 2003/0018557 | A1 * | 1/2003 | Gilbert | G06Q 40/02 705/36 R |
| 2004/0098323 | A1 * | 5/2004 | Bowser | G06Q 30/0603 705/35 |
| 2005/0144124 | A1 * | 6/2005 | Stiff | G06Q 20/10 705/39 |
| 2005/0289031 | A1 * | 12/2005 | Campbell | G06Q 40/00 705/35 |
| 2007/0011069 | A1 | 1/2007 | Bevacqua | |
| 2007/0033124 | A1 * | 2/2007 | Herr | G06Q 10/1057 705/35 |
| 2007/0106589 | A1 | 5/2007 | Schirripa | |

(Continued)

OTHER PUBLICATIONS

Dunn, Peter. "Can't rollover my 401(k), so what do I do?", The Pete the Planner Blog, Jun. 26, 2014. (Year: 2014).*

(Continued)

*Primary Examiner* — Abhishek Vyas
*Assistant Examiner* — Abdulmajeed Aziz
(74) *Attorney, Agent, or Firm* — Foley & Lardner LLP

(57) ABSTRACT

Computer systems and methods for generating portable and data-agnostic annuity datasets are disclosed where a central server generates multiple instructions to receive annuity dataset data records, participant attributes, and annuity attributes for a plurality of annuity datasets from employer servers and recordkeeper servers; integrates different annuity datasets by mapping the data fields of each respective annuity dataset and creating uniform data-agnostic annuity datasets; continuously monitors a performance value for each data-agnostic annuity dataset; and dynamically modifies recordkeepers when the performance value of annuity datasets do not satisfy a pre-determined threshold by modifying recordkeeper data records.

14 Claims, 3 Drawing Sheets

(56) References Cited

U.S. PATENT DOCUMENTS

| | | | |
|---|---|---|---|
| 2008/0189218 A1* | 8/2008 | Herschler | G06Q 40/00 705/36 R |
| 2008/0270194 A1 | 10/2008 | West et al. | |
| 2009/0006251 A1* | 1/2009 | Haase | G06Q 20/102 705/40 |
| 2010/0131423 A1* | 5/2010 | Meyer | G06Q 40/06 705/36 R |
| 2010/0332382 A1* | 12/2010 | Monk | G06Q 20/10 705/39 |
| 2012/0078664 A1* | 3/2012 | Hasan | G06F 19/324 705/3 |
| 2012/0215716 A1* | 8/2012 | Shier, Jr. | G06Q 40/06 705/36 R |
| 2013/0013531 A1* | 1/2013 | Chuang | G06Q 40/06 705/36 R |
| 2013/0185224 A1* | 7/2013 | Williams, Sr. | G06Q 40/02 705/36 R |
| 2014/0279638 A1* | 9/2014 | Raymond | G06Q 10/1057 705/322 |
| 2016/0086279 A1* | 3/2016 | Williams | G06F 16/2455 705/36 R |
| 2016/0103897 A1* | 4/2016 | Nysewander | G06F 16/254 707/602 |
| 2017/0195994 A1* | 7/2017 | Cole | H04W 76/10 |
| 2017/0249701 A1* | 8/2017 | Pabrai | G06F 16/22 |
| 2018/0240192 A1 | 8/2018 | Castineiras et al. | |

OTHER PUBLICATIONS

U.S. Appl. No. 62/1459,239, filed Feb. 15, 2017; Inventor: George A. Castineiras et al., 8 pages.

U.S. Appl. No. 62/523,972, filed Jun. 23, 2017; Inventor: George A. Castineiras et al., 19 pages.

* cited by examiner

COLLABORATIVE TRUST PLATFORM WITH PORTABLE FILES

CROSS REFERENCE TO RELATED APPLICATIONS

This application claims priority to U.S. Provisional Patent Application Ser. No. 62/462,636, filed on Feb. 23, 2017, which is hereby incorporated by reference in its entirety.

FIELD OF DISCLOSURE

The present invention relates to data communication and, more particularly, to systems and methods for a collaborative platform.

BACKGROUND

A lifetime income or a wrap investment is a series of equal payments at regular intervals as a form of financial investment entitling the investor to a series of annual sums upon maturation of the investment. Examples of lifetime income investment include annuities, monthly insurance payments, and pension payments. The payments (e.g., deposits) may be made weekly, monthly, quarterly, yearly, lump sum, or at any other interval of time. Many institutions offer investment programs for their employees as a part of their benefit package. These investments are highly valuable because employee's income is deferred until the liquidation (e.g., the money is withdrawn, distributed, or matured by the plan sponsor), which reduces the current tax liability for the employee. Supplemental retirement investments provide the same tax savings when workers contribute to them through an employer with pretax income. As the processing power of computers allow for greater computer functionality and the internet technology era allows for interconnectivity between computing systems, many parties involved (e.g., employer, participant or the employee, the investment recordkeepers, and investment providers) utilize computer implemented resources to manage the investment accounts, provide information, and monitor the progress of their investment account. In today's world, non-computer investment management methods have been rendered obsolete because use of computer-implemented methods provides fast, accurate, and efficient results that are in-tune with consumer expectations.

Since the implementation of these more sophisticated online tools, however, several shortcomings in these technologies have been identified and have created a new set of impediments. For example, many recordkeepers do not have a method to make all the investment datasets uniform and transferrable. As a result, most recordkeepers (even when both recordkeepers manage annuities associated with the same participant) are not able to effectively communicate. Furthermore, investment accounts are not portable and may not be transferred when an employee changes jobs. In many instances, the employee must either wait to liquidate (e.g., cash out) the amount of money after maturation of the investment (which may include annuitized option) or pay heavy penalties in order to cash out and subsequently re-invest the money into another investment plan provided by employee's new employer. This discourages many from investing in investment income accounts, thus negatively affecting the industry's objectives. Furthermore, many recordkeepers may user different computer infrastructure, which creates technical difficulties when combining different datasets associated with different institutions.

SUMMARY

For the aforementioned reasons, there is a desire for a more efficient system and method for universal investment data records, which would reduce the administrative burden and allow participants, recordkeepers, and investment providers to seamlessly transfer investment data records and transfer funds/assets to a centralized trust capable of utilizing different investment providers. There is a desire for a collaborative, adaptive, portable, aggregated, liquid, and collective investment trust, which is data-agnostic and uniform to all investment datasets. There is a desire for a network and computer-specific set of rules to generate a portable investment dataset. There is also a desire for a computer specific set of rules to provide a central server in communication with multiple recordkeepers and capable of transferring investment datasets between different recordkeepers and investment providers despite the recordkeeper utilizing different computer systems, file types, and computer infrastructures. Furthermore, there is a desire to provide an efficient and accurate collaborative platform when facing a high number of investment datasets and multiple modifications from different parties involved.

In the systems and methods described herein, a central server provides a function that is not available in conventional systems. The central server can communicate with multiple investment providers (utilizing recordkeepers associated with said investment providers) to allow for a transfer of data associated with a participant from one plan sponsor to another, whereas such a transfer of data is not available in conventional systems where the participant would need to establish a new dataset when changing employers or plan sponsors. The central server may also represent a collection of various investments pooled together. The central server conveys portability of an investment for a participant, and the portability is realized via the central server connections and processes described herein.

In an embodiment, a computer system comprises an employer server storing a record of an investment account corresponding to a participant, the record of the investment account comprising a first set of profile data; a first recordkeeper computing device of a first investment provider configured to generate and store files in a first format, the first recordkeeper computing device storing an investment data record corresponding to the investment account in the first format; a second recordkeeper computing device of a second investment provider configured to generate and store files in a second format that is incompatible with the first format; a server communicatively coupled to the employer server, first recordkeeper computing device, and the second recordkeeper computing device, wherein the server is configured to receive from a participant computing device a request to create a portable investment dataset associated with the participant of the participant computing device; generate a first instruction to receive the first set of profile data corresponding to the investment account of the participant; upon transmitting the first instruction to the employer server, receive the first set of profile data; generate a second instruction configured to receive the investment data record of the participant, wherein the investment data record comprises a plurality of attributes associated with the investment account and monetary data; upon transmitting the second instruction to the first recordkeeper computing device, receive the investment data record in the first format; map one or more data fields within the investment data record in the first format to identify the plurality of attributes associated with the investment account; generate in a database the portable investment dataset in a third format comprising one or more data fields configured to store data associated with the first set of profile data and the identified attributes of the investment data record; continuously monitor a performance value corresponding to the investment account; upon the performance value satisfying a first threshold, determine whether the second recordkeeper computing device attribute satisfies a second threshold; modify the one or more data fields within the portable investment dataset, wherein the modification designates the second recordkeeper with the participant instead of the first recordkeeper and maintains a monetary attribute of the investment data record; and transmit a notification to the second recordkeeper computing device designating the participant with the second recordkeeper and causing the second recordkeeper computing device to generate a new data record for the participant in the second format; and the database comprising a plurality of portable investment datasets for a plurality of participants, where each portable investment dataset designates one of a plurality of recordkeepers, where each portable investment dataset was generated by a recordkeeper computing device, where the portable investment dataset stores the plurality of portable investment datasets in a data record having a third format, and where each portable investment dataset corresponds to an investment account having a monetary attribute that is independent of the corresponding recordkeeper.

In another embodiment a computer-implemented method comprises receiving, by a server from a participant computing device, a request to create a portable investment dataset associated with the participant of the participant computing device; generating, by the sever, a first instruction to receive the first set of profile data corresponding to the investment account of the participant; upon transmitting the first instruction to an employer server, receiving, by the server, the first set of profile data, the employer server storing a record of an investment account corresponding to a participant, the record of the investment account comprising a first set of profile data; generating, by the server, a second instruction configured to receive the investment data record of the participant, wherein the investment data record comprises a plurality of attributes associated with the investment account and monetary data; upon transmitting the second instruction to a first recordkeeper computing device, receiving, by the server, the investment data record in the first format, the first recordkeeper computing device of a first investment provider configured to generate and store files in a first format, the first recordkeeper computing device storing an investment data record corresponding to the investment account in the first format; mapping, by the server, one or more data fields within the investment data record in the first format to identify the plurality of attributes associated with the investment account; generating, by the server, in a database the portable investment dataset in a third format comprising one or more data fields configured to store data associated with the first set of profile data and the identified attributes of the investment data record, the database comprising a plurality of portable investment datasets for a plurality of participants, where each portable investment dataset designates one of a plurality of recordkeepers, where each portable investment dataset was generated by a recordkeeper computing device, where the portable investment dataset stores the plurality of portable investment datasets in a data record having a third format, and where each portable investment dataset corresponds to an investment account having a monetary attribute that is independent of the corresponding recordkeeper; continuously monitoring, by the server, a performance value corresponding to the investment account; upon the performance value satisfying a first threshold, determining, by the server, whether a second recordkeeper computing device attribute satisfies a second threshold, the second recordkeeper computing device of a second investment provider configured to generate and store files in a second format that is incompatible with the first format; modifying, by the server, the one or more data fields within the portable investment dataset, wherein the modification designates the second recordkeeper with the participant instead of the first recordkeeper and maintains a monetary attribute of the investment data record; and transmitting, by the server, a notification to the second recordkeeper computing device designating the participant with the second recordkeeper and causing the second recordkeeper computing device to generate a new data record for the participant in the second format.

It is to be understood that both the foregoing general description and the following detailed description are exemplary and explanatory and are intended to provide further explanation of the invention as claimed.

BRIEF DESCRIPTION OF THE DRAWINGS

Certain aspects of the present invention are depicted in the accompanying drawings, which are intended to be considered in conjunction with the detailed description below, and which are intended to be illustrative rather than limiting, and, in which.

DETAILED DESCRIPTION

While various aspects and embodiments have been disclosed, other aspects and embodiments are contemplated. The various aspects and embodiments disclosed are for purposes of illustration and are not intended to be limiting, with the true scope and spirit being indicated by the following claims.

Figure 1:
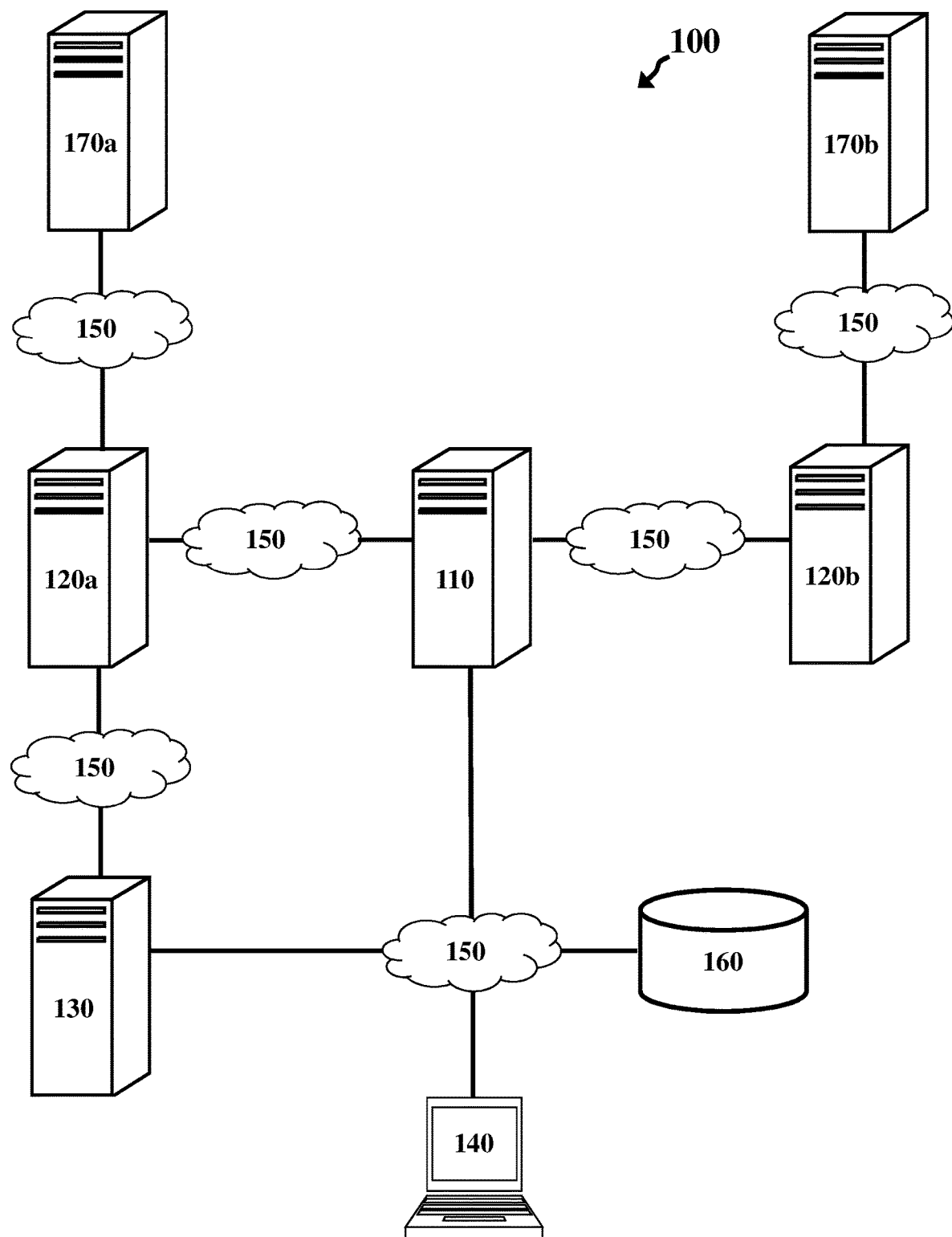
FIG. 1 illustrates an example of a system for generating a portable investment dataset, according to an embodiment.

FIG. 1 illustrates components of a system 100, according to an exemplary embodiment. The system 100 comprises an analytics server 110, recordkeeper devices 120a-b, investment provider devices 170a-b, an employer server 130, user device 140, and database 160. The mentioned computing devices may communicate with each other and with the analytics server 110 via the communication network 150, such as the Internet.

In operation, the user device 140 may request the analytics server 110 to generate a portable investment dataset, transfer the portable investment dataset to a desired central trust, and/or derive various forms of analytical information from the data records of the employer server 130, the recordkeeper devices 120a-b, or the investment account/central trust. The employer server 130 may store data records that are associated with interactions between the participant and the employer or the recordkeeping parties, where the data records each contain at least one field identifying all pertinent information regarding the participant, investment plan/account, and/or the recordkeeper devices 120*a-b* (including information regarding the investment provider devices 170*a-b*). The employer server 130 may also record information associated with the participant's investment plan/account, such as the type of the investment plan, terms/conditions associated with the investment, the recordkeeper, and/or the investment provider. The employer server 130 may be hosted on any number of devices comprising a non-transitory machine-readable storage medium capable of storing data records received from the analytics server 110, and in some cases, the recordkeeper devices 120*a-b* or the user device 140. The employer server 130 may further comprise a processor capable of executing various queries and data record management processes, according to instructions from the analytics server 110. One having skill in the art would appreciate that the employer server 130 may be hosted on a distinct device that is in networked-communication with the analytics server 110. One skilled in the relevant art will appreciate that plan sponsor and employer may or may not be the same institution may be or different entities within the same institution. However, for the purposes of brevity and clarity, the present disclosure uses the terms "employer" and "plan sponsor" interchangeably.

The analytics server 110 may perform various analyses on data records stored on the employer server 130, received from the recordkeeper devices 120*a-b*, database 160, or user device 140. The analytics server 110 may transmit the results of the analyses to any of the above-mentioned devices/parties within the system 100. The analytics server 110 may also generate multiple graphical user interfaces configured to receive data from the user device 140, generate/modify a portable investment dataset, and display the portable investment dataset in a collaborative platform to one or more parties (e.g., the user device 140 and/or the recordkeeper devices 120*a-b*). The analytics server 110 may be any device comprising a processor capable of performing the various tasks and processes described herein. Non-limiting examples of the analytics server 110 may include a server, desktop, laptop, tablet, and the like. The analytics server 110 comprises any number of computer-networking components, which facilitate inter-device communications via the communication network 150. One having skill in the art would appreciate that there may be any number of distinct devices functioning as the analytics server 110 in a distributed computing environment. In operation, the participant, utilizing the user device 140, may access a web-based service or application hosted by the analytics server 110, from which the participant may provide various types of data relevant to the participant's investment plan/account, the participant's employer, and/or modify details regarding the investment or the centralized trust. The user device 140 may be any device comprising a processor capable of performing the various tasks and processes described herein. Non-limiting examples of the user device 140 may include a server, desktop, laptop, tablet, and the like.

Recordkeeper devices 120*a-b* may be any computing device comprising a processor capable of performing the various tasks and processes described herein and associated with different recordkeepers. Non-limiting examples of the recordkeeper devices 120*a-b* may include a server, desktop, laptop, tablet, and the like. The recordkeeper devices 120*a-b* may comprise any number of computer-networking components (e.g., network interface card) that facilitate inter-device communications via the communication network 150. In operation recordkeeper devices 120*a-b* may represent devices associated with different recordkeepers. As explained below, a recordkeeper is a party responsible for managing the day-to-day operations of the participant's investment account. The recordkeeper may monitor the assets of each participant and their respective investments within an investment pool (e.g., an investment pool including all the investment associated with different participants, who are invested in a central collective trust). Recordkeepers are also responsible for tracking participant contribution rates and investment selections, providing account statements and daily valuations, and maintaining records of the investment accounts. For example, a recordkeeper associated with an investment account may be responsible to select an investment provider. An investment provider may be any entity that provides investment opportunities for the participants. Non-limiting example of an investment provider is an investment fund (e.g., mutual funds, exchange-traded funds, money market funds, and hedge funds), which is a supply of capital belonging to numerous investors used to collectively purchase securities while each investor retains ownership and control of his own shares. Other non-limiting examples may include a target date fund, stable value fund, and a percentage or unit of a trust. The investment providers, within the present disclosure, are represented by investment provider devices 170*a-b*. In operation, the recordkeeper devices 120*a-b* and the investment provider devices 170*a-b* may directly communicate. In some embodiments, the recordkeeper devices 120*a-b* are associated with or a part of the same institution as the investment provider devices 170*a-b*. For example, an investment provider may also provide recordkeeping services. The recordkeeper devices 120*a-b* may transmit pertinent investment information (e.g., investment plans) to the investment provider devices 170*a-b*. The investment provider (utilizing the investment provider device 170*a-b*) may then invest the assets associated with the participant and transmit the received information and investment data associated with the investment account to the recordkeeper devices 120*a-b*. Traditionally, investment provider devices 170*a-b* utilize recordkeeper devices 120*a-b* to access or communicate with the participants and/or the plan sponsor. The participants and/or plan sponsors may not be in direct communication with the investment provider. In some embodiments, the analytics server 110 may contact (or be required to contact) the investment provider devices 170*a-b* through the recordkeeper devices 120*a-b*. Many investment providers and recordkeepers may use different and/or unique communication methods, such as files or other methods to communicate. Communicating with different/multiple recordkeepers and different/multiple investment providers has been proven a very difficult technical problem.

Even though the present disclosure refers to devices 120*a-b* as "recordkeeper devices," each of the devices 120*a* or 120*b* may be a third party associated with a financial institution or an investment provider. For example, recordkeeper device 120*a* may be associated with investment provider A, which manages the participant's investment account and recordkeeper device 102*b* may be associated with investment provider B, which may be a competitor of investment provider A and may not be associated with the participant or the participant's employer. In other embodiments, a record keeper device and an investment provider device may belong to the same entity/institution and may be hosted on distinct devices that are in networked-communication with each other. For example, investment provider A may also act as the recordkeeper A (e.g., the investment provider A may invest the assets associated with the investment account and provide day-to-day operations of the investment account, such as providing the participant with pertinent information regarding the investment account). As described below, the analytics server 110 may monitor performance indicators associated with the participant's investment provider and may utilize other investment providers in order to maximize the participant's profits/income stream and/or ensure a maximum "payout" value. Continuing with the example above, the analytics server 110 may determine that investment provider B is a more suitable choice for the participant's investment account and will utilize investment provider B instead of investment provider A. A person skilled in the relevant art will appreciate that the analytics server 110 has the ability and not an obligation to select multiple investment provider. The recordkeeper devices 120*a*-*b* may be any device comprising a processor capable of performing the various tasks and processes described herein. Non-limiting examples of the recordkeeper devices 120*a*-*b* may include a server, desktop, laptop, tablet, and the like. The recordkeeper devices 120*a*-*b* may comprise any number of computer-networking components (e.g., network interface card) that facilitate inter-device communications via the communication network 150.

The system 100 may also include a third party database 160, which is configured to store information regarding the recordkeepers, investment providers, or other pertinent financial information. The database 160 may also store federal regulations, and other pertinent authoritative legal or financial information. For example, the third party database 160 may store data associated with the financial market, recordkeepers, investment providers, such as the rate of return, actuarial investment rate, or the credit worthiness of the investment provider. As explained below, the analytics server 110 may query the database 160 and continuously monitor investment provider's status and performance.

Figure 2:
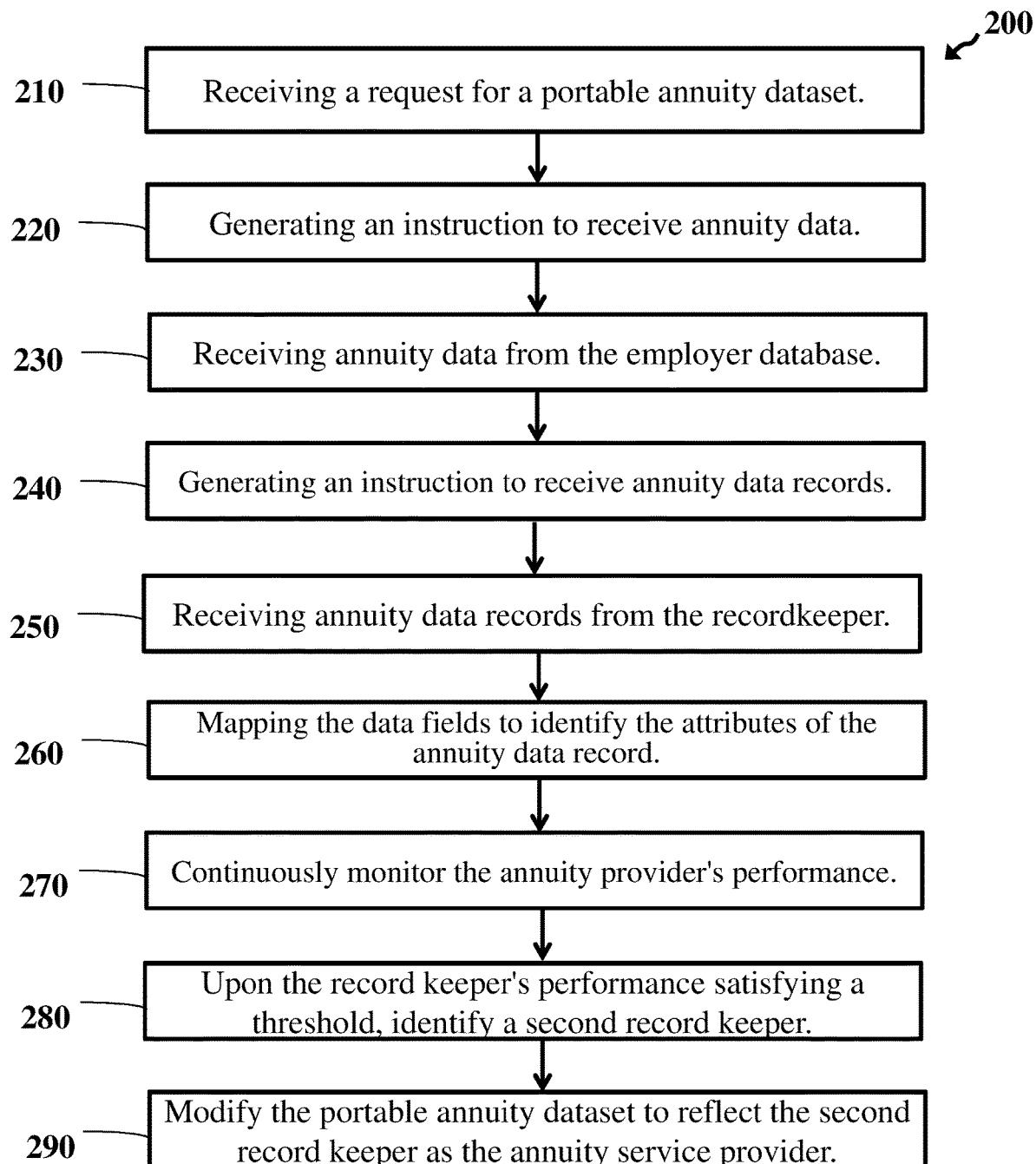
FIG. 2 illustrates operational steps of a method for generation, modification, and transmittal of a portable investment dataset, according to an embodiment.

Referring now to FIG. 2, a flowchart depicting operational steps of a method for generation, modification, and transmittal of a portable investment dataset is provided. Steps of the method 200 may be implemented using the analytics server, the recordkeeper devices, the investment provider devices, the user device, and/or the employer server. FIG. 2 does not imply any limitations with regard to the environments or embodiments that may be implemented. Modifications to the depicted environment or the embodiment shown in FIG. 2 may be made. While certain aspects may be illustrated herein with reference to an investment account, it is expressly understood that these embodiments can be configured to apply to a variety of financial services and investments. Non-limiting examples of an investment may include annuity plans, target date funds (TDF) with or without lifetime income benefits, stable value fund (SVF), exchange-traded funds (ETF), individual retirement account (IRA), and the like.

At step 210, the analytics server may receive a request to generate a portable investment dataset. The analytics server may receive this request from a participant operating a computing device (such as the user computing device illustrated in FIG. 1). In some embodiments, the participant may have changed (or changing) employers (e.g., plan sponsors) and desires to participate in the adaptive and portable investment services utilizing a central and collective trust offered by an institution associated with the analytics server. A person skilled in the relevant art will appreciate that a plan sponsor and an employer may be the same entity. While the employer is traditionally associated with an institution that employs the participant, the plan sponsor is traditionally defined as the entity providing the investment opportunities to the employees. The terms "employer" and "plan sponsor" have been interchangeably used herein. The analytics server may generate and display (on the computing device) a graphical user interface (GUI), which is configured to receive, utilizing one or more input fields, information regarding the participant, the employer, and the like. Utilizing the GUI provided by the analytics server, the participant may provide personal identification and identify his employer, the investment account, and/or investment plan. The analytics server can provide an investment provider-agnostic and data-agnostic central trust for the participant's investment accounts and invest the participant's assets within said central trust. The exemplary systems and methods can also be used in a scenario where a participant or a plan sponsor decides to utilize mobile and transferrable investment services in the absence of an employment change (described in FIG. 3).

As described below, the plan sponsor or the participant may dictate terms and conditions for the selection of different investment providers (e.g., an employer may desire to utilize an investment provider with pre-determined credit worthiness or other criteria). The plan sponsor or the participant may utilize a self-brokerage user interface provided by the analytics server to input or modify terms and condition of the investment plan. For example, a participant may use the self-brokerage user interface to select different investment providers, modify investment amount, increase or decrease the contribution amount, or liquidate the investment account. As explained below, the analytics server may utilize the self-brokerage user interface to provide investment data, different investment providers, and other information for the plan sponsor or the participant.

At step 220, the analytics server may generate an instruction to receive investment data. The analytics server may generate an instruction and identify the participant (using the data received in step 210). The instruction may be configured to instruct a database to transmit all data associated with any investment plan associated with the participant. For example, the instruction may identify the participant and request for all pertinent data, such as the investment terms and condition, attributes, and identification of the recordkeeper used. A recordkeeper is a party responsible for managing the day-to-day administrative and repository operations of the investment (e.g., investment account in this embodiment). The recordkeeper may also utilize services of an investment provider to invest the participant's assets. The recordkeeper may transfer assets within participant's investment account to an investment provider, monitor the assets, and provide recordkeeping services to the participant and/or the plan sponsor. For example, the recordkeeper may be responsible for tracking participant contribution rates and investment selections, providing account statements, and maintaining records of outstanding participant loans. A person skilled in the relevant art will appreciate that the recordkeeping duties may also be performed by the participants' employer or the investment provider.

At step 230, the analytics server may receive the participant and investment data. The analytics server may transmit the instruction to a database or a server associated with the participant's employer (such as the employer server illustrated in FIG. 1). Upon the transmission of the instruction, the analytics sever may receive the data (e.g., data associated with the participant and the investment plan including the investment provider information and identification, and any other data associated with the participant's investment plan/ account) from the employer's database. In some embodiments, the analytics server may utilize an application program interface (API) native to the employer server and in direct communication with the analytics server; in those embodiments, the API may query data associated with the participant's investment plan and transmit the data to the analytics server.

At step 240, the analytics server may generate another instruction to receive an investment data record comprising detailed information regarding the investment plan such as terms and conditions, maturations date, payment history, annuitization data, identity information (SSN or alternate unique ID), name and Address, Email, current age or DOB, gender, marital status, current account balance, employment status/plan status, current total annual contribution amount (employee and employer), current annual income, desired guaranteed income at retirement, and projected retirement date, minimum withdraw benefit, and the like.

At step 250, the analytics server may receive the investment data record. The analytics server may transmit the instruction to a database or a server that is associated with the participant's recordkeeper and receives participant's investment data record. As explained above, in some embodiments, the analytics server may utilize an API native to the recordkeepers server and in direct communication with the analytics server; in those embodiments, the API may query for and transmit the investment data record to the analytics server.

The analytics server may also receive all the above-mentioned data from the employer's server. For example, the employer's server, upon receiving the first instruction from the analytics server (in step 220), may query a server associated with the recordkeeper (e.g., the recordkeeper's devices as illustrated in FIG. 1) and transmit all the data directly to the analytics server. In other embodiments, the employer server may authorize the analytics server to receive the participant's investment data records from the recordkeeper's device. For example, upon receiving an instruction from the analytics server (step 220), the employer's server may transmit a token to the analytics server and the recordkeeper device in order to uniquely identify and authorize the analytics server. A token is an electronic representation of an authorization grant from the employer's server and may include alphanumerical string generated based on a random values. The employer server may encrypt the data contained within the token using variety of existing methods in order to combat possible fraud. Continuing with the example above, the analytics server may then transmit the token to the recordkeeper device. The recordkeeper device may be configured to only transmit information upon recognition of the token. The recordkeeper device may confirm the identity of the token (by matching the token received form the analytics server to the token received from the employer server) and subsequently transmit the data records to the analytics server.

At step 260, the analytics server may map the data fields within the received investment data records in order to identify attributes associated with the investment plan/account. Data mapping, as used by the analytics server, may refer to a process of creating data element mappings between two distinct data models. The analytics server may use data mapping as a method for a wide variety of data integration tasks including: data transformation or data mediation between a data source (e.g., recordkeeping device) and a destination (e.g., analytics server), identification of data relationships as part of data lineage analysis, or discovery of hidden sensitive data (such as the last four digits of a social security number hidden in another user id as part of data masking). The analytics server may use a variety of existing methods to map and identify attributes of participant's investment plan. Non-limiting examples of an attribute of an investment plan/account may include but not limited to terms and conditions associated with the investment plan such as the amount of money invested, maturations dates/terms, risk assessment, and the like. The analytics server may then, generate a portable investment dataset comprising all the data received in steps 230-250 and all the data identified as a result of data mapping (e.g., attributes associated with the investment plan). By allowing the analytics server to adapt to the file format of each recordkeeper, system 100, increases efficiency of file transfer by eliminating the requirement to have rigid or uniform file types and removing the need for manual entry by the recordkeeper, participant, or the employer.

In some embodiments, the data received from the employer server and the data received from the recordkeeper may not be in the same data format. For example, the employer may utilize a different computer environment, infrastructure, or ecosystem to create the participant datasets. The above-mentioned data format conflict has created a technical hurdle for conventional software solutions; receiving large number of data sets from disparate data sources with different data types and file formats creates a technical hurdle to providing a collaborative investment platform. As a result, the analytics server generates maps different data fields and generates a unified portable investment dataset, which is data-agnostic and compatible with computing infrastructures utilized by the employer, first recordkeeper, and the second recordkeeper. In a non-limiting example, an employer may store a participant's accounting information in pdf format and the first recordkeeper may store the participant's investment account information using a homegrown (in-house) software module. The analytics server may perform data mapping, extract the information, and create a unified portable dataset that is compatible with both of the above-mentioned parties (e.g., could be used by the recordkeeper and the employer). In some embodiments, the analytics server may convert the data to the appropriate data format before communicating with each party.

At step 270, the analytics server may dynamically monitor the investment provider's performance regarding the participant's investment account. The analytics server may continuously monitor the participant's investment account and its progress. For example, the analytics server may generate a liquidation value or a payout value (in accordance with the terms and conditions of the investment plan) associated with the investment account and based on the present value of the investment account. In another example, the analytics server may monitor the types of investments (e.g., how risk-averse the investments are and whether the investments chosen by the investment provider or the investment manager of the trust are consistent with terms and conditions of the investment plan). The analytics server may transmit a notification to the user device and display the above-mentioned data for the participant in real time (e.g., a daily valuation of the investment account). Daily value of an investment account may refer to the present value of said account, which may refer to the current value of a set of cash flows in the future, given a specified rate of return. In contrast to the present value of an investment account, a future value (e.g., payout value) of an investment account may refer to the value of a group of recurring investment payments at a specified date in the future.

In an embodiment, the present ordinary value of an investment account (or any other lifetime income account) may be calculated by the following formula:

$$P = PMT \times ((1 - (1/(1+r)^n))/r)$$

Where, P represents the present value of an investment stream, PMT represents the dollar amount of each investment payment, r represents the interest rate, and n represents the number of periods in which payments will be made. A person skilled in the ordinary art will appreciate that many other present value calculation methods (using other recordkeeping data) may exist and utilized by the analytics server. Non-limiting examples of recordkeeping data used to calculate income or the present value of an investment account may include age of participant, gender of participant, projected age to take income (default to social security age), marital status, age of spouse, gender of spouse, preferred retirement income options, balance in account/account units, loaned funds (remaining balance), interest rate on loan(s), and remaining months on loan(s). The analytics server may use the above-mentioned method to calculate the present value of the investment account. The analytics server may also account for other fees in accordance with the investment account's terms and conditions, such as liquidation fees and the like.

At step 280, the analytics sever may, upon the investment provider's performance satisfying a threshold, identify a second investment provider. The analytics server may evaluate the investment provider's performance by comparing the performance indicators with pre-determined thresholds. The pre-determined thresholds may be received from the participant, determined based on the investment plan, or otherwise inputted/programmed into the analytics server. For example, the participant may indicate a threshold of 10% decline in the payout value of the investment account. The analytics server may continuously monitor the payout value, and notify the participant if the payout value has declined by 10% or more. In another embodiment, the analytics server may compare the investment provider's performance with other investment providers within the market, selected by the participant, or indicated within the investment plan. For example, the analytics server may calculate performance metrics of the participant's investment account under different investment providers and generate a report for the participant, which informs the participant regarding how the participant's investment account would change if the participant selects another investment provider. If the analytics server determines that any of the pre-determined thresholds are satisfied (e.g., investment provider's performance is not satisfactory), the analytics server may identify a second investment provider for the participant's investment account. Identification of the second investment provider may be based on pre-determined criteria (e.g., a second threshold). For example, the analytics server may use credit worthiness as criteria to identify the second investment provider. The second threshold may also be received form the participant (e.g., user computing device) or the employer (plan sponsor computing device). The analytics server may query a third-party database (such as the database 160 illustrated in FIG. 1) in order to identify a second investment provider. In some other embodiments, the threshold may be determined based on the investment plan. For example, some investments (e.g., guaranteed wrap income accounts) may already have a guaranteed value (e.g., payout value). In those embodiments, the analytics server may utilize the guaranteed values as the threshold.

In some embodiments, the investment provider may invest the assets within the investment account into a fund of funds, also known as a multi-manager investment. A fund of funds is an investment strategy in which a fund invests in other types of funds. This strategy invests in a portfolio that contains different underlying assets instead of investing directly in bonds, stocks and other types of securities. The investment provider or the group trust may offer a "lineup" of different funds. These funds may have a wide range of creditworthiness. For example, all investment accounts associated with a plan sponsor may be invested in a lineup of five different funds, two of which may not be as creditworthy as the rest of the funds. Traditionally, a plan sponsor was "locked in" the lineup and could not change the investment opportunities. However, by enrolling in the trust generated by the analytics server, the plan sponsor, and the participant are no longer subjugated to the risk-averse and undesirable funds and may select their own investments.

At step 290, the analytics server may modify and adjust the portable investment dataset to reflect the second investment provider as the investment service provider. The analytics server may adjust/modify a data field within the portable investment dataset and notify the first and the second investment providers by transmitting a notification to their respective investment provider devices. The analytics server may also transmit the portable investment dataset to the second investment provider's device. In some configurations, the analytics server may cause the assets of the participant to be transferred into an account associated with the second investment provider. In some embodiments, the participant's assets remain within the collective trust. For example, the analytics server may only use a second recordkeeper and a second investment provider to invest the participants' assets while maintaining the participant's assets within the central trust.

In some embodiments, it may not be in the participant's best interest to continue with an investment provider as the investment provider of the participant's investment account. In those embodiments, the analytics server may identify a more suitable investment provider for the participant (e.g., an investment provider satisfying a pre-determined threshold such as an investment provider with better credit rating). The analytics server may generate a recommendation configured to display data regarding the new and more suitable investment provider and transmit said notification to a computing device associated with the participant.

The analytics server may transmit the portable investment dataset to a computing device associated with the central trust's investment manager and receive input (e.g., investment recommendation) from an investment manager. The analytics server may utilize the self-brokerage user interface to display the investment manager's recommendation to the participant. In some embodiments, the analytics server may generate a communication session (e.g., a chat session or any other querying method) in order to connect the participant with the investment manager. Upon receiving approval and authorization from the participant, the analytics server may adjust and modify the portable investment dataset to reflect the second investment provider as the investment provider of the participant's investment account. By implementing this method, the analytics server may maximize the overall/lifetime rate of return and/or payout value for the participant's investment account by continuously utilizing the most appropriate investment provider and ensuring that the assets within the participant's investment account is managed by the most appropriate investment provider. If necessary, the analytics server may also generate an instruction and transmit said instruction to a financial institution associated with the investment account to transfer the assets to another account associated with the second investment provider. Furthermore, the analytics server may also calculate other actuarial data such as prevailing pre-retirement asset accumulation rates, historic post-retirement projected interest rates, projected post-retirement mortality, commercially available income options, and income options guaranteed by providers. The analytics server may display any of the above-mentioned actuarial data in the self-brokerage user interface. While the analytics server has the ability to utilize more than one investment provider, the analytics server does not have the obligation to change investment providers. For example, an investment account may be managed by the same investment provider until its maturation or liquidation date.

In some embodiments, the participant's new employer may utilize the same investment provider and/or recordkeeper. The analytics server may transmit a notification to the investment provider configured to display participant's information and desire to participate in a portable investment. The portable investment data record may be similar to the received data record from the recordkeeper as there may not be a need to change the file format or modify any information. However, the analytics server may still monitor the performance of the investment provider and the financial well-being of the investment account and may change investment provider as described above.

Figure 3:
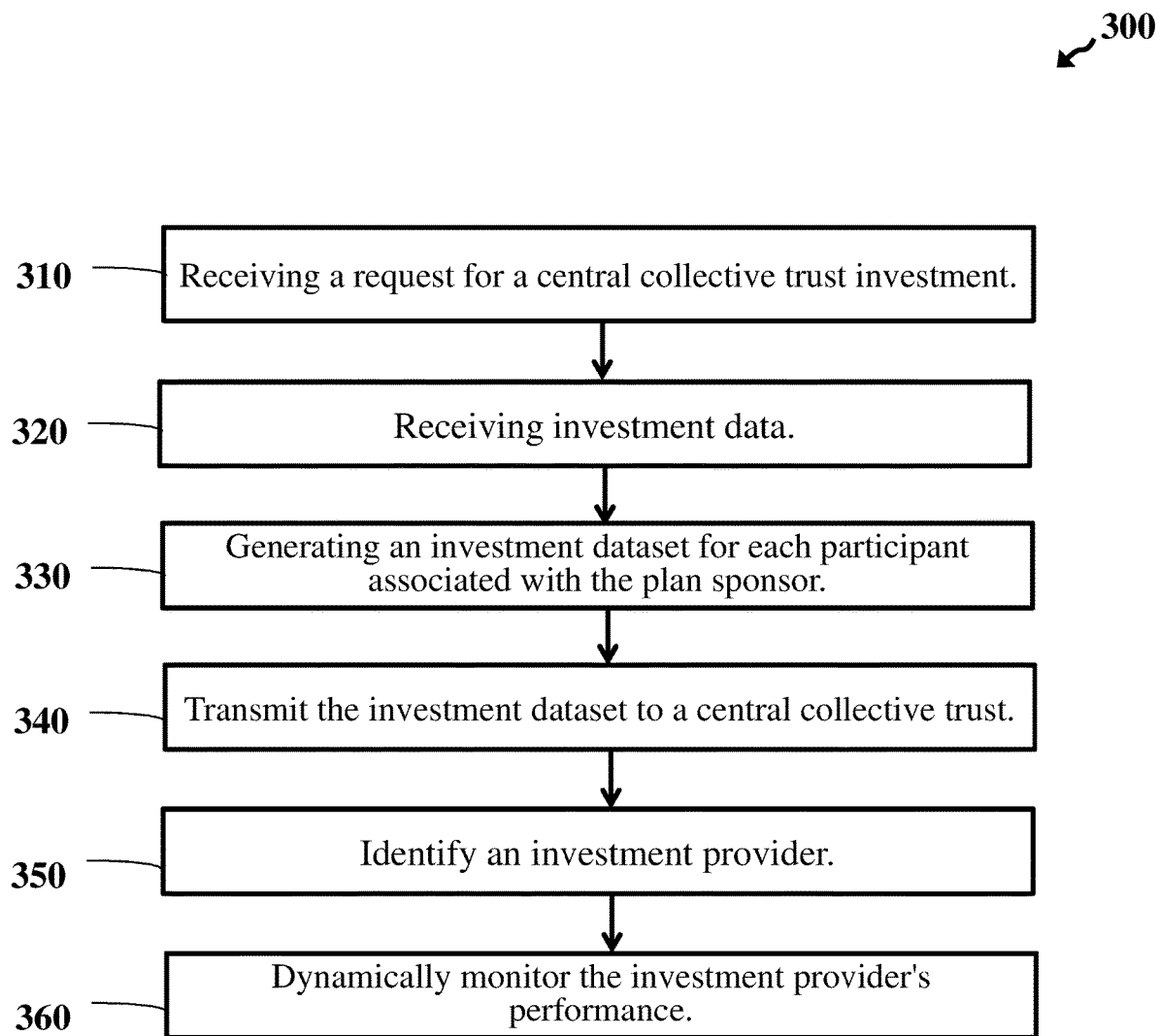
FIG. 3 illustrates operational steps of a method for generation, modification, and transmittal of a portable investment dataset within a central trust, according to an embodiment.

Referring now to FIG. 3, a flowchart depicting operational steps of a method for generation, modification, and transmittal of a portable investment account datasets within a central trust is provided. Steps of the method 300 may be implemented using the analytics server, the recordkeeper devices, the investment provider devices, the user device, and/or the employer server. FIG. 3 does not imply any limitations with regard to the environments or embodiments that may be implemented. Modifications to the depicted environment or the embodiment shown in FIG. 3 may be made. While certain aspects may be illustrated herein with reference to an investment and investment accounts, it is expressly understood that these embodiments can be configured to apply to a variety of lifetime investments or the underlying funds.

At step 310, the analytics server may receive a request to generate and manage one or more portable investment accounts associated with a plan sponsor. In some embodiments, a participant or a plan sponsor may decide to utilize mobile and transferrable investment services associated with an institution associated with the analytics server. For example, a participant may request to generate a portable investment account, move the assets within his investment accounts into a central trust associated with the analytics server, and keep the assets within the central trust until the maturation of the investment account. In other embodiments, an employer (e.g., plan sponsor) may request the institution associated with the analytics server to manage the assets associated with the several investment accounts within a central trust. The employer may desire to use the analytics server to dynamically utilize different investment providers and manage the investment accounts in order to maximize the profit associated with each investment account (e.g., the payout value to the participant, or the daily valuation).

At step 320, the analytics server may receive investment data. The analytics server may generate an instruction to receive data associated with participants and transmit said instruction to a server associated with the plan sponsor (e.g., employer's server illustrated in FIG. 1). In other embodiments, the analytics server may receive all pertinent data directly from the plan sponsor. For example, an API native to the employer server and in direct communication with the analytics server may query data associated with the participant's investment plan (investment plan agreed upon by the employer and the participant) and transmit the data to the analytics server. Alternatively, the analytics server may generate and display a GUI configured to receive data regarding plan sponsor's investment and receive the information directly from an administrator operating a computing device associated with the plan sponsor or the participant.

At step 330, the analytics server may generate an investment dataset for each participant. As explained above an investment dataset is a dataset comprising several data fields configured to store data associated with each participant and their investment plan. Non-limiting examples of data included within the investment dataset may include identity information (SSN or alternate ID), name and Address, Email, current age or DOB, gender, marital status, current account balance, employment status/plan status, current total annual contribution amount (employee and employer), current annual income, desired guaranteed income at retirement, rate of return, participant's investment preferences, and projected retirement date.

The analytics server, at step 340, may transmit all the assets associated with the participants into a central trust. The analytics server may transfer all the assets associated with each investment account into the central trust and identify a suitable investment provider (such as an investment provider explained in FIG. 2) for the participants' investment account. In some embodiments, the analytics server may only transfer the assets upon receiving instructions, investment managers, and/or authorization from the participant or the plan sponsor. By enrolling into a central trust provided by the analytics server, plan sponsor may only need to enroll in one fund and have one qualified default investment alternative (QDIA). Plan sponsors may also be relieved of constant searching for better funds and investments because the analytics server may provide a guaranteed long-term income. ERISA and the corresponding regulations define how a plan sponsor can establish protective relief from liability as a fiduciary for investment decisions made by employees in participant-directed investment plans. According to the Pension Protection Act of 2006, plan sponsors have the option to designate a default fund, qualifying as a QDIA. If the designated plan complies with the requirements of the regulation, the fiduciary (e.g., plan sponsor) will not be liable for losses that result from investments in the QDIA. In other words, a central trust (generated by the analytics server and described herein) may be designated as the QDIA account/fund by the plan sponsor, which will minimize plan sponsor's liability. Because of this perpetual safe harbor (e.g., limited liability and less credit risk on their investments), plan sponsors can offer a more secure rate of return to their employees.

The analytics server may also present the participant an opportunity to change the nature of his/her investment. For example, if a plan sponsor utilizes the central trust provided by the analytics server, the investment may not be necessarily designated as a specific type of an investment, such as an "annuity." The assets associated with the participant may be simply invested by the analytics server into a central investment trust with recognized QDIA credentials. The analytics server, as show above, may invest participant's assets (or a portion of the assets) in an investment account. As a result, participant's assets may be liquid and the participant may not be charged with a redemption or liquidation fee. Simply put, the participants have the ability to purchase an investment in a central investment trust and not become subjected to an immobile and rigidly structured investment plans such as annuity plans.

At step 350, the analytics server may identify an investment provider suitable for the plan sponsor. As explained above, the analytics server may identify a suitable investment provider by evaluating the performance of different investment providers within the market that meets the needs of the participant. The analytics server may also communicate and transmit the investment dataset to the investment provider devices. In some embodiments, the analytics server may identify a recordkeeper's device associated with the investment provider and transmit the investment dataset to the recordkeeper's device. As explained above, the analytics server may utilize several investment providers based on criteria received from the plan sponsor and/or the participant. For example, a younger participant may choose to invest a portion of his assets in a more risk-prone investment and/or fully annuitize the rest of the investment. The analytics server may receive these participant preferences through a self-brokerage user interface provided to the computing device associated with the participant. The analytics server may also provide the investment dataset to a computing device associated with a trust manager and receive investment recommendations from the trust manager. Furthermore, the analytics server may also utilize a proprietary fund associated with the institution associated with the analytics server or invest the assets in a fund of funds. For example, an institution associated with the analytics server may be an investment firm. The investment firm may invest the assets within the collective trust similar to an investment provider. In some embodiments, the investment firm associated with the analytics server may receive a CUSIP credentials (designated to the collective trust) and federally trade the assets within the trust as securities.

In some embodiments, the analytics server may display the identified investment providers in a self-brokerage user interface. For example, the analytics server may display a list of different investment providers and provide the participant an option to select his investment provider of choice within the collective trust. The participant may select a specific investment provider or select a group of investments based on investment preferences (e.g., how risk-averse the investment providers are or creditworthiness of the investment providers). For example, the participant may select a stable value fund, which is an investment vehicle found in some company retirement plans. Stable value funds may be comprised of mostly synthetic guaranteed investment certificates, also known as wrapped bonds, because of their inherent stability. These bonds can have a short or intermediate term with longer maturities than other choices such as money market funds. In some embodiments, a stable value fund may be paired, or wrapped, with insurance contracts to guarantee a specific minimum return. Stable value funds are typically less risky and may be chosen by more fiscally conservative participants or participants closer to retirement age.

The analytics server may also provide an option (e.g., present the option through the self-brokerage user interface) to the participant to select a specific glide path. A glide path refers to a formula that defines the asset allocation mix of a target date fund, based on the number of years to the target date. In some embodiments, the glide path creates an asset allocation that becomes more conservative (e.g., includes more fixed-income assets and fewer equities) the closer a fund gets to the target date. Each family of target date funds may have a different glide path, which determines how the asset mix changes as the target date approaches.

At step 360, the analytics server may dynamically monitor the investment provider's performance regarding the participant's investment account. As explained above, the analytics server may continuously monitor the participant's investment account and its progress. The analytics server may also generate and transmit a notification to the computing devices associated with the plan sponsor or the participants regarding the performance of the investment providers and may change investment providers upon receiving instructions (from the plan sponsor or the participant).

The analytics server may also issue loans to the participants using their investments as collateral. For example, the analytics server may receive a request from the participant (e.g., through the self-brokerage user interface or any other user interface provided to the participant) requesting a loan from their investments. The analytics server may liquidate the participant's assets, generate a loan dataset for the participants, and modify the corresponding investment datasets to reflect the changes. If the participant has more than one investments (e.g., the participant is utilizing more than one investment providers or has a glide path as explained above), the analytics server may query different the investment datasets, determine the lowest yielding investment associated with the participant, and generate the loan based on the lowest yielding investment. Liquidating the lowest-yielding account and generating the loan out of said account may optimize the participant's overall profit.

In some embodiments, the analytics server may provide the participants with a near retirement interest rate analysis. The analytics server may determine whether a participant is near retirement or near maturation of his investments when a participant satisfies a pre-determined threshold. For example, the analytics server may determine all participants within two years (or another pre-determined threshold) of their retirement (or investment maturation date) by dynamically querying participant information received in step 330. The analytics server may then determine a prevailing market rate of return and other actuarial data associated with the participants' investment accounts. The analytics server may generate a notification to the participants (e.g., utilizing the self-brokerage user interface or other notification methods) and inform the participants regarding their retirement date, the prevailing market rate, projected income stream after retirement, and other information regarding their investments. The analytics server may also provide an option (based on a projected rate of return at their retirement age) for the participants near retirement age to liquidate their assets. For example, if the analytics server determines that the prevailing market rate of return may decrease by the time a participant retires, the analytics server may recommend liquidation. Upon receiving authorization from the participant, the analytics server may liquidate the participant's investment account based on a current rate of return or other terms and conditions agreed upon by the participant.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer system for generating a portable investment dataset for universal transferability of one or more investment accounts in a central trust when the investment accounts are not transferrable after a participant changes employers, the computer system comprising:

an employer server storing a record of an investment account corresponding to a participant, the record of the investment account comprising a first set of profile data;

a first recordkeeper computing device of a first investment provider configured to generate and store files in a first format, the first recordkeeper computing device storing an investment data record corresponding to the investment account in the first format;

a second recordkeeper computing device associated with one second investment provider of a plurality of second investment providers configured to generate and store files in a second format that is incompatible with the first format and any other format;

a database comprising a plurality of portable investment datasets for a plurality of participants, where each portable investment dataset designates one of a plurality of recordkeeper computing devices, where the portable investment dataset stores the plurality of portable investment datasets in a data record having a unified format, and where each portable investment dataset corresponds to an investment account having a monetary amount that is independent of the corresponding recordkeeper computing device; and an analytic server corresponding to the central trust communicatively coupled to the employer server, first recordkeeper computing device, the database, and the second recordkeeper computing device, wherein the analytic server is configured to:

receive, from a participant computing device, an enrollment request to create a portable investment dataset corresponding to the one or more investment accounts associated with the participant operating the participant computing device, wherein the investment dataset corresponds to an investment in an annuity plan, target date funds with or without lifetime income benefits, stable value fund, exchange-traded funds, or individual retirement account;

query to receive, from an application programming interface of the employer server, the first set of profile data corresponding to the one or more investment accounts of the participant;

query to receive, from an application programming interface of the first recordkeeper computing device, the investment data record of the participant, wherein the investment data record comprises a plurality of attributes, including the monetary amount, associated with the one or more investment accounts, the investment data record for each respective investment account being in the first format;

map one or more data fields within the investment data record in the first format, wherein the analytics server executes an extraction and a mapping algorithm to identify each attribute according to a data lineage analysis;

identify the plurality of attributes associated with the one or more investment accounts;
generate in a database the portable investment dataset in the unified format comprising one or more data fields configured to store the first set of profile data and the identified attributes of the investment data record;
continuously monitor, in real time, a performance value associated with the one or more investment accounts;
upon the performance value satisfying a first threshold;
identify the second recordkeeper computing device associated with the one second investment provider of the plurality of second investment providers based on satisfying a second threshold;
display a notification comprising a recommendation indicating the second recordkeeper computing device associated with the one second investment provider to the participant;
in response to receiving authorization of the recommendation from the participant, modify the one or more data fields within the portable investment dataset, wherein the modification designates the second recordkeeper computing device associated with the one second investment provider with the participant instead of the first recordkeeper computing device and maintains the monetary amount of the investment data record, whereby the modification prevents liquidation of assets associated with the one or more investment accounts when the participant changes employers; and
transmit a notification to the second recordkeeper computing device associated with the one second investment provider designating the participant with the second recordkeeper computing device and causing the second recordkeeper computing device to generate a new data record, stored onto the database, for the participant in the second format.

2. The computer system according to claim 1, wherein the analytic server is further configured to:
generate a liquidation value associated with the portable investment dataset based on the attributes.

3. The computer system of claim 1, wherein the analytic server is further configured to:
generate a payout value associated with the portable investment dataset based on the attributes.

4. The computer system of claim 1, wherein the first threshold is based on a payout value associated with the investment account.

5. A computer-implemented method for generating a portable investment dataset for universal transferability of one or more investment accounts in a central trust when the investment accounts are not transferrable after a participant changes employers, the method comprising:
receiving, by an analytic server from a participant computing device, an enrollment request to create a portable investment dataset corresponding to one or more investment accounts associated with the participant operating the participant computing device, wherein the investment dataset corresponds to an investment in an annuity plan, target date funds with or without lifetime income benefits, stable value fund, exchange-traded funds, or individual retirement account;
querying, by the analytic server, to receive, from an application programming interface of an employer server, a first set of profile data corresponding to one or more investment account of the participant;
the employer server storing a record of the one or more investment accounts corresponding to the participant, the record of the investment account comprising a first set of profile data;
querying, by the analytic server, to receive, from an application programming interface of a first recordkeeper computing device, an investment data record of the participant, wherein the investment data record comprises a plurality of attributes including the monetary amount associated with the one or more investment accounts, the investment data record for each respective investment account being in the first format;
mapping, by the analytic server, one or more data fields within the investment data record in the first format, wherein the analytics server executes an extraction and a mapping algorithm to identify each attribute according to a data lineage analysis;
identifying, by the analytic server, the plurality of attributes associated with the one or more investment accounts;
generating, by the analytic server in a database, the portable investment dataset in a unified format comprising one or more data fields configured to store the first set of profile data and the identified attributes of the investment data record, the database comprising a plurality of portable investment datasets for a plurality of participants, where each portable investment dataset designates one of a plurality of recordkeeper computing devices, where the portable investment dataset stores the plurality of portable investment datasets in a data record having unified format, and where each portable investment dataset corresponds to an investment account having a monetary amount that is independent of the corresponding recordkeeper computing device;
continuously monitoring, by the analytic server in real time, a performance value associated with the one or more investment accounts;
upon the performance value satisfying a first threshold:
identifying, by the analytic server, the second recordkeeper computing device associated with one second investment provider of a plurality of second investment providers based on satisfying a second threshold;
display a notification comprising a recommendation indicating the second recordkeeper computing device associated with the one second investment provider of the plurality of second investment providers to the participant, the second recordkeeper computing device associated with the one second investment provider of the plurality of second investment providers configured to generate and store files in a second format that is incompatible with the first format;
in response to receiving authorization of the recommendation from the participant, modifying, by the analytic server, the one or more data fields within the portable investment dataset, wherein the modification designates the second recordkeeper computing device associated with the one second investment provider with the participant instead of the first recordkeeper computing device and maintains a monetary amount of the investment data record, whereby the modification prevents liquidation of assets associated with the one or more investment accounts when the participant changes employers; and transmitting, by the analytic server, a notification to the second recordkeeper computing device associated with the one second investment provider designating the participant with the second recordkeeper computing device and causing the second recordkeeper computing device to generate a new data record, stored onto the database, for the participant in the second format.

6. The computer-implemented method of claim 5, further comprising:
generating, by the analytic server, a liquidation value associated with the portable investment dataset based on the attributes.

7. The computer-implemented method of claim 5, further comprising:
generating, by the analytic server, a payout value associated with the portable investment dataset based on the attributes.

8. The computer-implemented method of claim 5, wherein the first threshold is based on a payout value associated with the investment account.

9. The computer system of claim 1, wherein the plurality of attributes comprises at least one of age of the participant, gender of the participant, projected age to take income, marital status, age of spouse of the participant, gender of spouse of the participant, preferred retirement income options, loaned funds for a loan, and interest rate on the loaned funds.

10. The method of claim 5, wherein the plurality of attributes comprises at least one of age of the participant, gender of the participant, projected age to take income, marital status, age of spouse of the participant, gender of spouse of the participant, preferred retirement income options, loaned funds for a loan, and interest rate on the loaned funds.

11. The computer system of claim 1, wherein the first threshold corresponds to a credit worthiness of the first investment provider.

12. The computer system of claim 1, wherein the second threshold corresponds to a credit worthiness of the one second investment provider of the plurality of second investment providers.

13. The method of claim 5, wherein the first threshold corresponds to a credit worthiness of the first investment provider.

14. The method of claim 5, wherein the second threshold corresponds to a credit worthiness of the one second investment provider of the plurality of second investment providers.

* * * * *